R. M. FISH.
Dumping Platform for Wagons.
No. 101,451.
2 Sheets—Sheet 1.
Patented April 5, 1870.
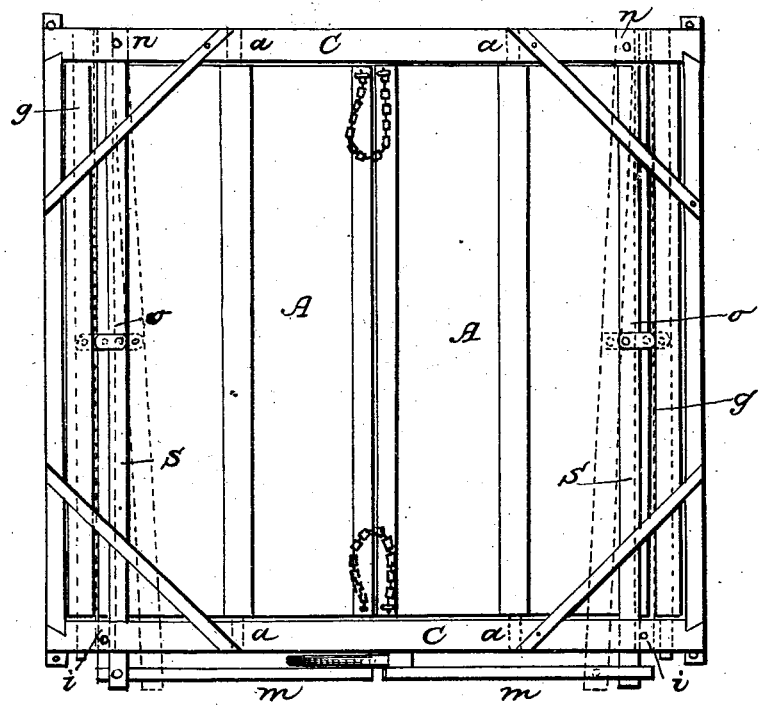
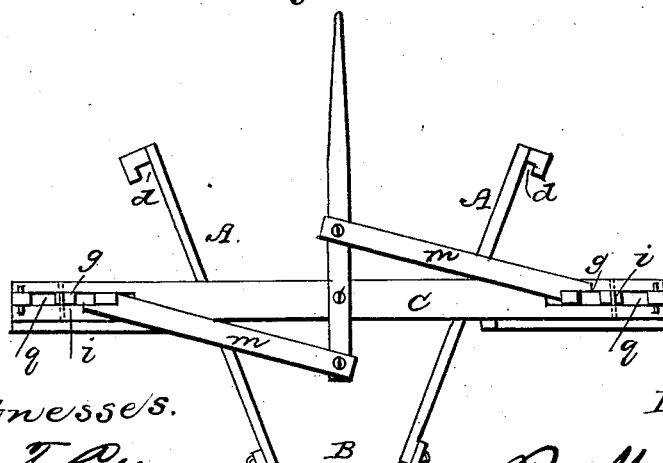

R. M. FISH.
Dumping Platform for Wagons.
No. 101,451.
2 Sheets—Sheet 2.
Patented April 5, 1870.
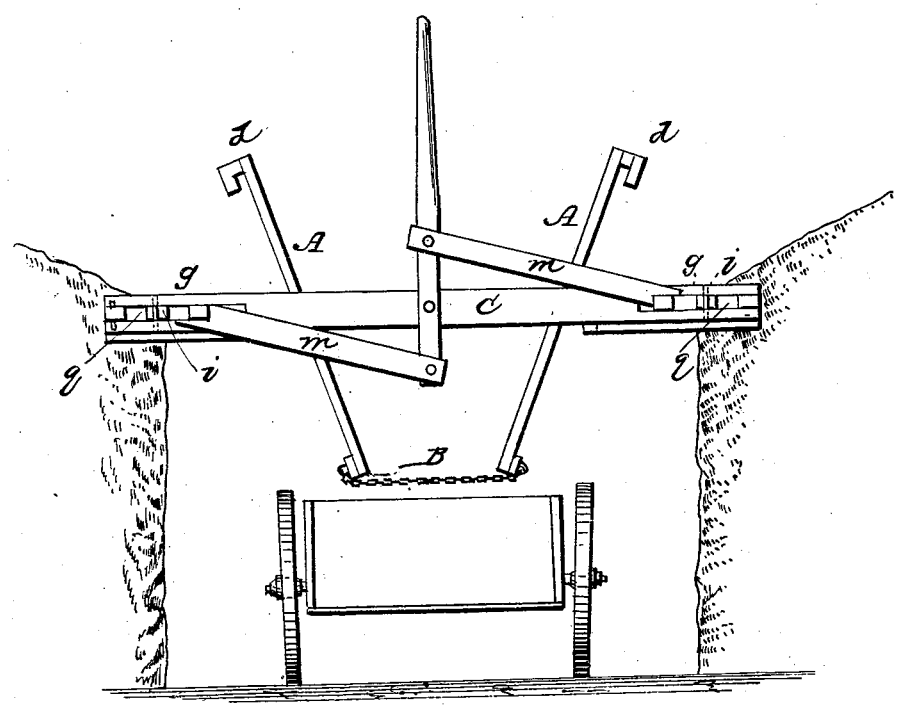

United States Patent Office.

R. M. FISH, OF GLENWOOD, IOWA.

Letters Patent No. 101,451, dated April 5, 1870.

IMPROVEMENT IN DUMPING-PLATFORMS.

The Schedule referred to in these Letters Patent and making part of the same.

To all whom it may concern:

Be it known that I, R. M. FISH, of Glenwood, in the county of Mills, in the State of Iowa, have invented a new and improved Dumping-Platform; and I do hereby declare the following to be a full, clear, and exact description of the same, reference being had to the accompanying drawings and to the letters of reference marked thereon, in which—

Figure 1 represents a bottom view or plan of the platform;

Figure 2, an end view of the same in dumped position, and

Figure 3, a similar view with car or cart in place to receive the matter being dumped from the platform.

The nature of my invention consists in a dumping-platform constructed of two leaves hung in a suitable frame, and operated by levers so arranged as to open or close the leaves at will.

My invention is intended to obviate the use of shovelers in loading vehicles with clay, sand, &c.; for instance, in railroad excavating, where a cut has to be made through high ground, the platform is placed in the cut sufficiently high to permit the dirt-carts to pass under it. Clay from the sides of the embankment is then scraped down upon the dumper, and, when enough to fill a cart has fallen thereon, the operating-lever of the platform is moved, which causes its leaves to fall, thereby dumping the dirt thereon into the cart below.

By this arrangement the expense of shovelers to fill the dirt-carts is avoided, the carts are not delayed waiting for their turn to be filled, and the work of carting and excavating is consequently performed with much more celerity than it is under the old form.

The platform can be moved along the entire length of the cut with very little trouble, and, when locked, is sufficiently strong to act as a bridge for scraper-teams to pass over.

To enable others skilled in the art to make and use my invention, I will proceed to describe its construction and operation.

A A in each figure represent the leaves of the platform turning upon the pivots a, and connected at their inner or lower ends by chains B, to adjust the spread of the leaves to the dimension required.

C C the frame-work or bottom sill supporting the platform

Beneath the outer ends of the leaves A are grooved pieces, d, firmly secured to said leaves, and extending their entire length.

g g are slides, which, by the joint action of the levers m and s are forced into the grooves when it is desired to lock the platform in horizontal position. These leaves are so constructed as to resume their horizontal position when relieved of their burden.

s s are levers with pivoted centers at n n.

q q are slots in the frame-work in which the levers s and slides g move forward or backward, the forward motion of the slides being limited by pins i i resting against shoulders of the same.

It will readily be seen that the slides being connected at the center with the lever s by the coupling-pieces o o, will have a uniform forward or backward parallel motion.

The platform is in place for the reception of dirt or other matter when, by the action of the levers, the slides are forced into the grooves d, which virtually locks it in a horizontal position. By a reverse movement of the levers the slides are withdrawn from the grooves, and consequently the platform will yield to the pressure of the material upon it and dump the same into the cart below.

It will, therefore, be readily seen that for an easy, economical, and rapid removal of dirt from embankments or excavations of any kind, the above is a simple and effective arrangement.

Having thus fully described my invention,

What I claim as new, and desire to secure by Letters Patent of the United States, is—

The double-action lever m, slides q, levers s, leaves A A, and frame C, the whole constructed, arranged, and operated in the manner and for the purposes herein set forth and described.

In testimony that I claim the foregoing invention I have hereunto set my hand this      day of August, 1869.

R. M. FISH.

Witnesses:
JNO. F. CALLAN,
G. W. McLANE.